(12) United States Patent
Nickolaou et al.

(10) Patent No.: US 10,196,007 B2
(45) Date of Patent: Feb. 5, 2019

(54) VEHICLE SENSOR MOUNTING SYSTEMS

(71) Applicant: GM GLOBAL TECHNOLOGY OPERATIONS LLC, Detroit, MI (US)

(72) Inventors: James N. Nickolaou, Clarkston, MI (US); Jeremy P. Gray, Clarkston, MI (US); Stephen W. Decker, Clarkston, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 76 days.

(21) Appl. No.: 15/353,164

(22) Filed: Nov. 16, 2016

(65) Prior Publication Data

US 2018/0134234 A1    May 17, 2018

(51) Int. Cl.
```
E04G 3/00      (2006.01)
B60R 11/04     (2006.01)
F16M 11/12     (2006.01)
B60R 11/00     (2006.01)
G05D 1/00      (2006.01)
```

(52) U.S. Cl.
CPC ........... *B60R 11/04* (2013.01); *F16M 11/126* (2013.01); *B60R 2011/004* (2013.01); *B60R 2011/0087* (2013.01); *B60R 2011/0092* (2013.01); *G05D 1/0088* (2013.01)

(58) Field of Classification Search
USPC ...................................................... 248/278.1
See application file for complete search history.

(56) References Cited

U.S. PATENT DOCUMENTS

| | | | | |
|---|---|---|---|---|
| 4,686,888 A * | 8/1987 | Sanborn | ................ | F41A 23/34 89/37.13 |
| 5,383,645 A * | 1/1995 | Pedut | .................. | F16M 11/126 248/550 |
| 5,897,223 A * | 4/1999 | Tritchew | ............. | G03B 15/006 348/144 |
| 5,954,310 A * | 9/1999 | Soldo | ..................... | F16M 11/14 248/550 |
| 6,357,936 B1 * | 3/2002 | Elberbaum | ............ | G03B 37/02 206/316.2 |
| 6,536,724 B2 * | 3/2003 | Furuta | ................. | F16M 11/123 248/178.1 |
| 7,030,579 B1 * | 4/2006 | Schmitz | ................. | F41A 23/24 318/139 |
| 7,175,150 B2 * | 2/2007 | Chi | ......................... | F16F 3/10 248/562 |

(Continued)

OTHER PUBLICATIONS

Gyro-Stabilized Systems (GSS), "Cinema Series—C520," was accessed on Nov. 15, 2016 from http://gyrostabilizedsystems.com/products-services/cinema-series/c520/.

*Primary Examiner* — Monica E Millner
(74) *Attorney, Agent, or Firm* — Lorenz & Kopf, LLP

(57) ABSTRACT

Systems are provided for mounting a sensor to a vehicle. In one embodiment, a sensor mounting system includes a mounting assembly coupled to a body of the vehicle. The mounting assembly has a first mounting plate spaced apart from a second mounting plate by at least one isolation member. The second mounting plate is coupled to the body of the vehicle. The sensor mounting system also includes a turret housing coupled to the first mounting plate so as to be movable relative to the first mounting plate. The turret housing defines at least one receptacle for a first sensing device.

19 Claims, 8 Drawing Sheets

(56) References Cited

U.S. PATENT DOCUMENTS

| | | | | |
|---|---|---|---|---|
| 7,416,168 B1* | 8/2008 | Callahan | B66F 3/00 254/266 |
| 7,955,006 B1* | 6/2011 | Harvey | F16M 11/10 396/12 |
| 8,330,646 B2* | 12/2012 | Baumatz | G01S 7/48 342/52 |
| 8,651,009 B2* | 2/2014 | Hayden | F41A 27/20 89/41.02 |
| 8,687,111 B2* | 4/2014 | McKaughan | G01C 3/08 348/207.99 |
| 8,816,933 B2* | 8/2014 | Scott | H01Q 3/04 343/725 |
| 9,280,038 B1* | 3/2016 | Pan | G03B 17/561 |
| 9,644,784 B2* | 5/2017 | Rudier | F16M 11/08 |
| 10,047,898 B2* | 8/2018 | Xie | F16M 11/18 |
| 10,047,905 B2* | 8/2018 | Yang | F16M 11/10 |
| 2002/0139926 A1* | 10/2002 | Ansley | H04N 3/08 250/234 |
| 2003/0222194 A1* | 12/2003 | Platus | F16F 15/02 248/619 |
| 2004/0173726 A1* | 9/2004 | Mercadal | F16M 11/10 248/660 |
| 2006/0033288 A1* | 2/2006 | Hughes | F16J 15/43 277/412 |
| 2008/0114560 A1* | 5/2008 | Jonas | F16M 11/123 702/94 |
| 2010/0171377 A1* | 7/2010 | Aicher | G01C 21/18 310/38 |
| 2010/0257999 A1* | 10/2010 | Domholt | F41A 27/20 89/41.02 |
| 2013/0048792 A1* | 2/2013 | Szarek | B64C 39/024 244/175 |
| 2014/0037278 A1* | 2/2014 | Wang | F16M 11/10 396/55 |
| 2014/0348498 A1* | 11/2014 | Aiba | G03B 13/32 396/20 |
| 2016/0352992 A1* | 12/2016 | Saika | H04N 5/2328 |
| 2017/0198747 A1* | 7/2017 | Chen | B64D 47/08 |

\* cited by examiner

VEHICLE SENSOR MOUNTING SYSTEMS

TECHNICAL FIELD

The present disclosure generally relates to autonomous vehicles, and more particularly relates to vehicle sensor mounting systems for mounting one or more sensors to the autonomous vehicle.

BACKGROUND

An autonomous vehicle is a vehicle that is capable of sensing its environment and navigating with little or no user input. An autonomous vehicle senses its environment using sensing devices such as radar, lidar, image sensors, and the like. The autonomous vehicle system further uses information from global positioning systems (GPS) technology, navigation systems, vehicle-to-vehicle communication, vehicle-to-infrastructure technology, and/or drive-by-wire systems to navigate the vehicle.

Vehicle automation has been categorized into numerical automotive levels ranging from Zero, corresponding to no automation with full human control, to Five, corresponding to full automation with no human control. Various automated driver-assistance systems, such as cruise control, adaptive cruise control, and parking assistance systems correspond to lower automation levels, while true "driverless" vehicles correspond to higher automation levels.

Generally, autonomous vehicles employ a number of long-range and short-range sensors to sense the environment surrounding the autonomous vehicle. In certain instances, it may be desirable to have one or more of these sensors movable relative to the vehicle in order to obtain a larger field of view for the one or more sensors. Moreover, in certain applications, such as object tracking, it may be desirable to have a long-range sensor and a short-range sensor with overlapping field of views, such that the short-range sensor may begin tracking the object upon entry into the short-range sensor's field of view and vice versa.

Accordingly, it is desirable to provide a vehicle sensor mounting system that enables one or more long-range sensors and one or more short range sensors to articulate relative to the vehicle, environment or road network. It is also desirable to provide a vehicle sensor mounting system in which at least one long-range sensor has a field of view that overlaps with a field of view of a short-range sensor, such that an object tracked by the long-range sensor may be tracked by the short-range sensor upon entry into the field of view of the short range sensor and vice versa. Furthermore, other desirable features and characteristics of the present disclosure will become apparent from the subsequent detailed description and the appended claims, taken in conjunction with the accompanying drawings and the foregoing technical field and background.

SUMMARY

Systems are provided for mounting a sensor to a vehicle. In one embodiment, a sensor mounting system includes a mounting assembly coupled to a body of the vehicle. The mounting assembly has a first mounting plate spaced apart from a second mounting plate by at least one isolation member. The second mounting plate is coupled to the body of the vehicle. The sensor mounting system also includes a turret housing coupled to the first mounting plate so as to be movable relative to the first mounting plate. The turret housing defines at least one receptacle for a first sensing device.

The turret housing is movable relative to the vehicle in one degree of freedom. The sensor mounting system includes a first slip ring that couples the turret housing to the first mounting plate. The sensor mounting system includes a drive system that moves the turret housing relative to the first mounting plate, with a portion of the drive system coupled to the first mounting plate. The drive system includes a motor, a drive gear and a driven ring gear. The motor has an output shaft coupled to the drive gear, and the drive gear is coupled to the driven ring gear such that an activation of the motor drives the drive gear, which drives the driven ring gear. The first mounting plate defines a chamber, and the drive gear of the drive system is received within the chamber. The driven ring gear is coupled to the turret housing. The turret housing includes a counterbore, and the mounting assembly is received within the counterbore such that the turret housing substantially surrounds the mounting assembly. The sensor mounting system includes a gimbal that includes a second sensing device and the gimbal is coupled to the first mounting plate. The at least one isolation member is at least one spring.

In one embodiment, a sensor mounting system includes a mounting assembly coupled to a body of the vehicle. The mounting assembly has a first mounting plate spaced apart from a second mounting plate by at least one isolation member. The second mounting plate is coupled to the body of the vehicle. The sensor mounting system also includes a turret housing coupled to the first mounting plate so as to be movable relative to the first mounting plate. The turret housing defines at least one receptacle for a first sensing device and the turret housing substantially surrounds the mounting assembly. The sensor mounting system includes a gimbal including a second sensing device coupled to the first mounting plate.

The turret housing is movable relative to the vehicle in one degree of freedom. The sensor mounting system includes a drive system that moves the turret housing relative to the first mounting plate, with a portion of the drive system coupled to the first mounting plate. The drive system includes a motor, a drive gear and a driven ring gear. The motor has an output shaft coupled to the drive gear, and the drive gear is coupled to the driven ring gear such that an activation of the motor drives the drive gear, which drives the driven ring gear. The first mounting plate defines a chamber, and the drive gear of the drive system is received within the chamber. The driven ring gear is coupled to the turret housing. The turret housing includes a counterbore, and the mounting assembly is received within the counterbore.

In one embodiment, an autonomous vehicle includes a spring plate coupled to a body of the autonomous vehicle. The spring plate has a first mounting plate spaced apart from a second mounting plate by at least one spring. The second mounting plate is coupled to the body of the autonomous vehicle. The autonomous vehicle includes a turret housing coupled to the first mounting plate so as to be movable relative to the first mounting plate. The turret housing defines at least one receptacle for a first sensing device and a counterbore, with the spring plate at least partially received within the counterbore such that the turret housing substantially surrounds the spring plate. The autonomous vehicle includes a gimbal having a second sensing device coupled to the first mounting plate.

The autonomous vehicle includes a drive system that moves the turret housing relative to the first mounting plate, with a portion of the drive system coupled to the first mounting plate. The drive system includes a motor, a drive gear and a driven ring gear. The motor has an output shaft coupled to the drive gear, and the drive gear is coupled to the driven ring gear such that an activation of the motor drives the drive gear, which drives the driven ring gear. The first mounting plate defines a chamber, and the drive gear of the drive system is received within the chamber.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. As used herein, the term module refers to any hardware, software, firmware, electronic control component, processing logic, and/or processor device, individually or in any combination, including without limitation: application specific integrated circuit (ASIC), an electronic circuit, a processor (shared, dedicated, or group) and memory that executes one or more software or firmware programs, a combinational logic circuit, and/or other suitable components that provide the described functionality.

Embodiments of the present disclosure may be described herein in terms of schematic, functional and/or logical block components and various processing steps. It should be appreciated that such block components may be realized by any number of hardware, software, and/or firmware components configured to perform the specified functions. For example, an embodiment of the present disclosure may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments of the present disclosure may be practiced in conjunction with any number of systems, and that the systems described herein is merely exemplary embodiments of the present disclosure.

For the sake of brevity, conventional techniques related to signal processing, data transmission, signaling, control, and other functional aspects of the systems (and the individual operating components of the systems) may not be described in detail herein. Furthermore, the connecting lines shown in the various figures contained herein are intended to represent example functional relationships and/or physical couplings between the various elements. It should be noted that many alternative or additional functional relationships or physical connections may be present in an embodiment of the present disclosure.

Figure 1:
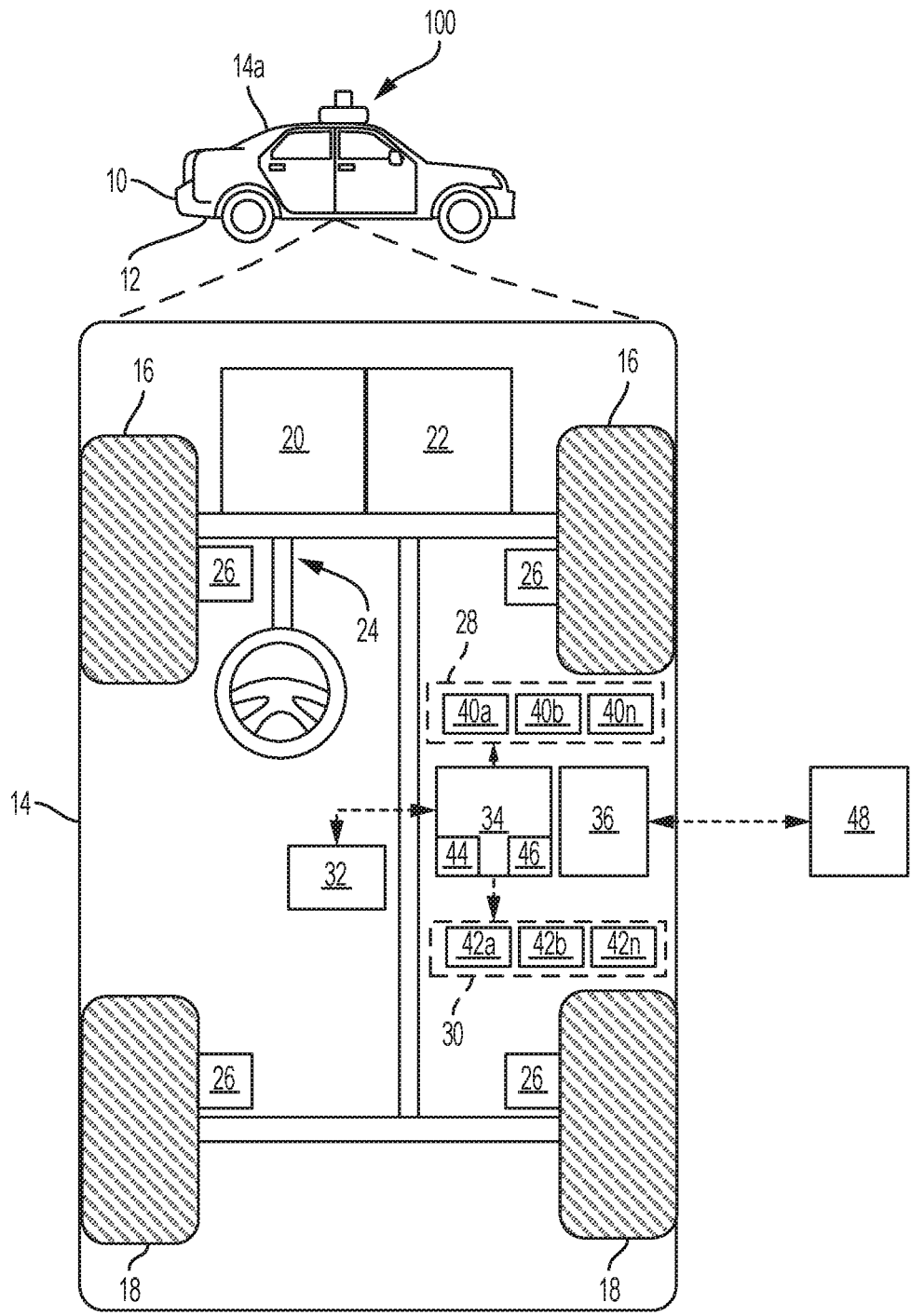
FIG. 1 is a functional block diagram illustrating an autonomous vehicle having a sensor mounting system, in accordance with various embodiments.

With reference to FIG. 1, a sensor mounting system shown generally at 100 is associated with a vehicle 10 in accordance with various embodiments. In general, the sensor mounting system 100 provides a mounting platform for one or more long-range sensor devices, one or more short-range sensor devices, one or more communication links, one or more antennas for a global positioning system (GPS) and combinations thereof. The sensor mounting system 100 is movable relative to the vehicle 10, such that the one or more long-range sensor devices, the one or more short-range sensor devices, the one or more communication links, and the one or more antennas for a global positioning system (GPS) are each movable relative to the vehicle 10. In the example of the sensor mounting system 100 including one or more long-range sensor devices and the one or more short-range sensor devices, the movement of the one or more long-range sensor devices and the one or more short-range sensor devices relative to the vehicle 10 enables the one or more long-range sensor devices and the one or more short-range sensor devices to have various fields of view.

As depicted in FIG. 1, the vehicle 10 generally includes a chassis 12, a body 14, front wheels 16, and rear wheels 18. The body 14 is arranged on the chassis 12 and substantially encloses components of the vehicle 10. The body 14 and the chassis 12 may jointly form a frame. The wheels 16-18 are each rotationally coupled to the chassis 12 near a respective corner of the body 14. In various embodiments, the sensor mounting system 100 is coupled to the body 14 of the vehicle 10, and in this example, is coupled to a roof 14a of the vehicle 10. It will be understood, however, that the sensor mounting system 100 may be coupled to the vehicle 10 at any desired location.

In various embodiments, the vehicle 10 is an autonomous vehicle and the sensor mounting system 100 is coupled to or incorporated with the autonomous vehicle 10 (hereinafter referred to as the autonomous vehicle 10). The autonomous vehicle 10 is, for example, a vehicle that is automatically controlled to carry passengers from one location to another. The autonomous vehicle 10 is depicted in the illustrated embodiment as a passenger car, but it should be appreciated that any other vehicle including motorcycles, trucks, sport utility vehicles (SUVs), recreational vehicles (RVs), marine vessels, aircraft, etc., can also be used. In an exemplary embodiment, the autonomous vehicle 10 is a so-called Level Three, Level Four or Level Five automation system. A Level Three system indicates "conditional automation," referring to the driving mode-specific performance by an automated driving system of all aspects of the dynamic driving task with the expectation that the human driver will respond appropriately to a request to intervene. A Level Four system indicates "high automation," referring to the driving mode-specific performance by an automated driving system of all aspects of the dynamic driving task, even if a human driver does not respond appropriately to a request to intervene. A Level Five system indicates "full automation," referring to the full-time performance by an automated driving system of all aspects of the dynamic driving task under all roadway and environmental conditions that can be managed by a human driver. It will be noted, however, that the sensor mounting system 100 may also be coupled to or incorporated with a lower level automation system, if desired.

As shown, the autonomous vehicle 10 generally includes a propulsion system 20, a transmission system 22, a steering system 24, a brake system 26, a sensor system 28, an actuator system 30, at least one data storage device 32, at least one controller 34, and a communication system 36. The propulsion system 20 may, in various embodiments, include an internal combustion engine, an electric machine such as a traction motor, and/or a fuel cell propulsion system. The transmission system 22 is configured to transmit power from the propulsion system 20 to the wheels 16-18 according to selectable speed ratios. According to various embodiments, the transmission system 22 may include a step-ratio automatic transmission, a continuously-variable transmission, or other appropriate transmission. The brake system 26 is configured to provide braking torque to the wheels 16-18 and/or the transmission system 22. The brake system 26 may, in various embodiments, include friction brakes, brake by wire, a regenerative braking system such as an electric machine, and/or other appropriate braking systems. The steering system 24 influences the course of travel by the autonomous vehicle 10, for example by adjusting a position of the wheels 16-18. While depicted as including a steering wheel for illustrative purposes, in some embodiments contemplated within the scope of the present disclosure, the steering system 24 may not include a steering wheel.

The sensor system 28 includes one or more sensors or sensing devices 40a, 40b . . . 40n that sense observable conditions of the exterior environment, as well as the interior environment and/or operating state of the autonomous vehicle 10. The sensing devices 40a, 40b . . . 40n can include, but are not limited to, radars, lidars, global positioning systems, optical cameras, thermal cameras, ultrasonic sensors, and/or other sensors, communication link devices or GPS antennas. In various embodiments, one or more of the sensing devices 40a, 40b . . . 40n are coupled to the autonomous vehicle 10 by the sensor mounting system 100. The actuator system 30 includes one or more actuator devices 42a, 42b . . . 42n that control one or more vehicle features, components, systems and/or functions such as, but not limited to, the propulsion system 20, the transmission system 22, the steering system 24, and the brake system 26. In various embodiments, the actuator system 30 may control other vehicle components and/or features, which can further include interior and/or exterior vehicle components and/or features, such as, but are not limited to, doors, a trunk, and cabin features such as air, music, lighting, etc.

The data storage device 32 stores data for use in automatically controlling the autonomous vehicle 10. In various embodiments, the data storage device 32 stores defined maps of the navigable environment. In various embodiments, the defined maps may be predefined by and obtained from a remote system (described in further detail with regard to FIG. 2). For example, the defined maps may be assembled by the remote system and communicated to the autonomous vehicle 10 (wirelessly and/or in a wired manner) and stored in the data storage device 32. As can be appreciated, the data storage device 32 may be part of the controller 34, separate from the controller 34, or part of the controller 34 and part of a separate system.

The controller 34 includes at least one processor 44 and a computer readable storage device or media 46. The processor 44 can be any custom made or commercially available processor, a central processing unit (CPU), a graphics processing unit (GPU), an auxiliary processor among several processors associated with the controller 34, a semiconductor based microprocessor (in the form of a microchip or chip set), a macroprocessor, any combination thereof, or generally any device for executing instructions. The computer readable storage device or media 46 may include volatile and nonvolatile storage in read-only memory (ROM), random-access memory (RAM), and keep-alive memory (KAM), for example. KAM is a persistent or non-volatile memory that may be used to store various operating variables while the processor 44 is powered down. The computer-readable storage device or media 46 may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 34 in controlling the autonomous vehicle 10.

The instructions may include one or more separate programs, each of which comprises an ordered listing of executable instructions for implementing logical functions. The instructions, when executed by the processor 44, receive and process signals from the sensor system 28, perform logic, calculations, methods and/or algorithms for automatically controlling the components of the autonomous vehicle 10, and generate control signals to the actuator system 30 to automatically control the components of the autonomous vehicle 10 based on the logic, calculations, methods, and/or algorithms. Although only one controller 34 is shown in FIG. 1, embodiments of the autonomous vehicle 10 can include any number of controllers 34 that communicate over any suitable communication medium or a combination of communication mediums and that cooperate to process the sensor signals, perform logic, calculations, methods, and/or algorithms, and generate control signals to automatically control features of the autonomous vehicle 10.

In various embodiments, one or more instructions of the controller 34 are associated with the sensor mounting system 100 and, when executed by the processor 44, the instructions receive and process signals from the one or more sensing devices 40a, 40b . . . 40n associated with the sensor mounting system 100 to determine various conditions of the autonomous vehicle 10. For example, as will be discussed herein, the instructions of the controller 34, when executed by the processor 44, receive and process sensor signals from the sensing devices 40a, 40b . . . 40n associated with the sensor mounting system 100, and determine whether an object is in a first field of view associated with a first portion of the sensor mounting system 100. Based on the determination, the processor 44 determines whether the object is within a second field of view of the sensing devices 40a, 40b . . . 40n associated with a second portion of the sensor mounting system 100. Based on the determination that the object is within the second field of view, the processor 44 may cause a movement of the second portion of the sensor mounting system 100 to track the object. In addition, the instructions of the controller 34, when executed by the processor 44, may cause a movement of the second portion of the sensor mounting system 100 relative to the autonomous vehicle 10 and/or relative to the first portion of the sensor mounting system 100. Further, the instructions of the controller 34, when executed by the processor 44, receive and process sensor signals from the sensing devices 40a, 40b . . . 40n associated with the sensor mounting system 100, and determine whether an object is in the second field of view associated with the second portion of the sensor mounting system 100. Based on the determination, the processor 44 determines whether the object is within the first field of view of the sensing devices 40a, 40b . . . 40n associated with the first portion of the sensor mounting system 100. Based on the determination that the object is within the first field of view, the processor 44 may cause a movement of the first portion of the sensor mounting system 100 to track the object. In addition, the instructions of the controller 34, when executed by the processor 44, may cause a movement of the first portion of the sensor mounting system 100 relative to the autonomous vehicle 10 and/or relative to the second portion of the sensor mounting system 100.

Figure 2:
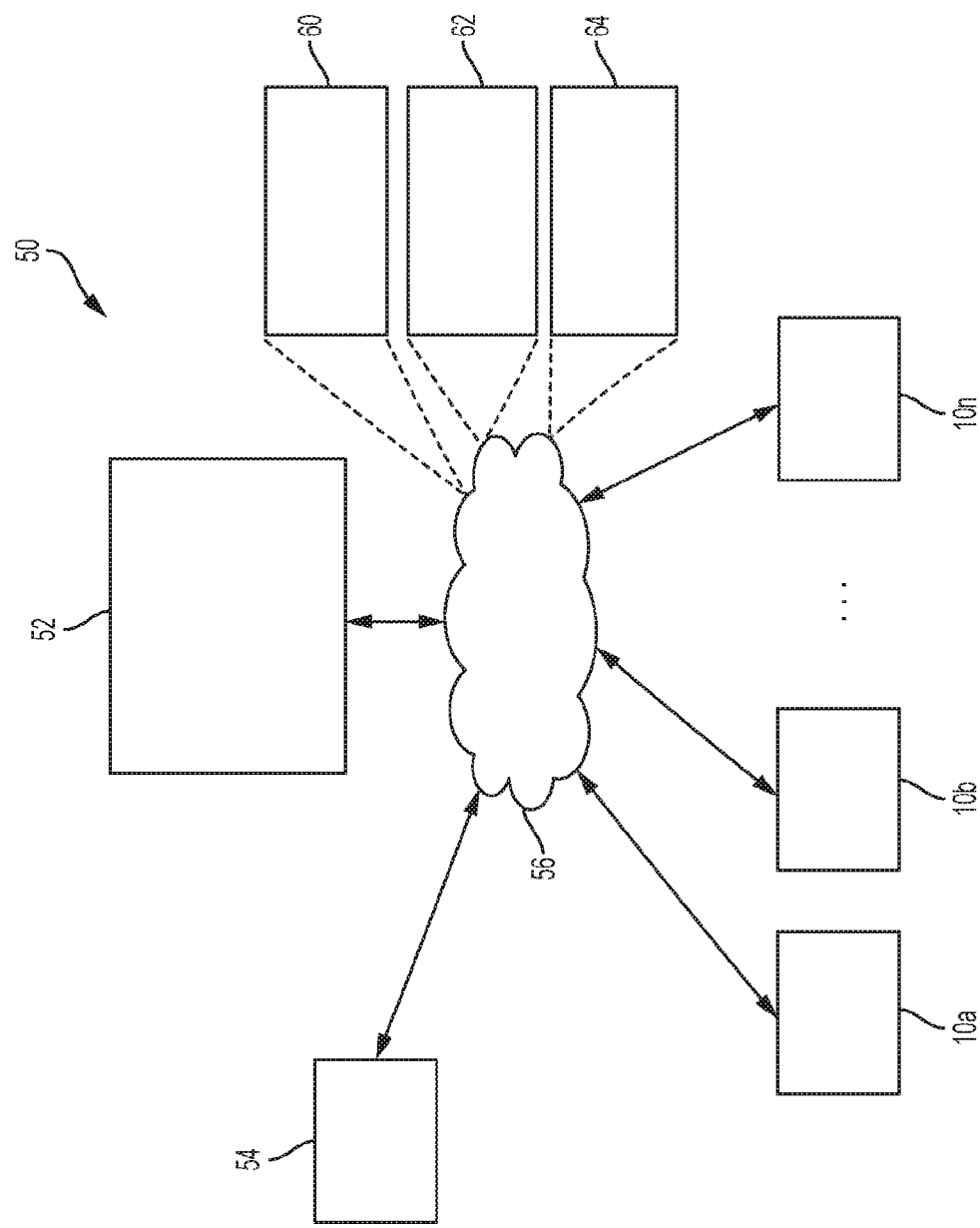
FIG. 2 is a functional block diagram illustrating a transportation system having one or more autonomous vehicles of FIG. 1, in accordance with various embodiments.

The communication system 36 is configured to wirelessly communicate information to and from other entities 48, such as but not limited to, other vehicles ("V2V" communication), infrastructure ("V2I" communication), remote systems, and/or personal devices (described in more detail with regard to FIG. 2). In an exemplary embodiment, the communication system 36 is a wireless communication system configured to communicate via a wireless local area network (WLAN) using IEEE 802.11 standards or by using cellular data communication. However, additional or alternate communication methods, such as a dedicated short-range communications (DSRC) channel, are also considered within the scope of the present disclosure. DSRC channels refer to one-way or two-way short-range to medium-range wireless communication channels specifically designed for automotive use and a corresponding set of protocols and standards.

With reference now to FIG. 2, in various embodiments, the autonomous vehicle 10 described with regard to FIG. 1 may be suitable for use in the context of a taxi or shuttle system in a certain geographical area (e.g., a city, a school or business campus, a shopping center, an amusement park, an event center, or the like) or may simply be managed by a remote system. For example, the autonomous vehicle 10 may be associated with an autonomous vehicle based remote transportation system. FIG. 2 illustrates an exemplary embodiment of an operating environment shown generally at 50 that includes an autonomous vehicle based remote transportation system 52 that is associated with one or more autonomous vehicles 10a, 10b . . . 10n as described with regard to FIG. 1. In various embodiments, the operating environment 50 further includes one or more user devices 54 that communicate with the autonomous vehicle 10 and/or the remote transportation system 52 via a communication network 56.

The communication network 56 supports communication as needed between devices, systems, and components supported by the operating environment 50 (e.g., via tangible communication links and/or wireless communication links). For example, the communication network 56 can include a wireless carrier system 60 such as a cellular telephone system that includes a plurality of cell towers (not shown), one or more mobile switching centers (MSCs) (not shown), as well as any other networking components required to connect the wireless carrier system 60 with a land communications system. Each cell tower includes sending and receiving antennas and a base station, with the base stations from different cell towers being connected to the MSC either directly or via intermediary equipment such as a base station controller. The wireless carrier system 60 can implement any suitable communications technology, including for example, digital technologies such as CDMA (e.g., CDMA2000), LTE (e.g., 4G LTE or 5G LTE), GSM/GPRS, or other current or emerging wireless technologies. Other cell tower/base station/MSC arrangements are possible and could be used with the wireless carrier system 60. For example, the base station and cell tower could be co-located at the same site or they could be remotely located from one another, each base station could be responsible for a single cell tower or a single base station could service various cell towers, or various base stations could be coupled to a single MSC, to name but a few of the possible arrangements.

Apart from including the wireless carrier system 60, a second wireless carrier system in the form of a satellite communication system 64 can be included to provide uni-directional or bi-directional communication with the autonomous vehicles 10a, 10b . . . 10n. This can be done using one or more communication satellites (not shown) and an uplink transmitting station (not shown). Uni-directional communication can include, for example, satellite radio services, wherein programming content (news, music, etc.) is received by the transmitting station, packaged for upload, and then sent to the satellite, which broadcasts the programming to subscribers. Bi-directional communication can include, for example, satellite telephony services using the satellite to relay telephone communications between the autonomous vehicle 10 and the station. The satellite telephony can be utilized either in addition to or in lieu of the wireless carrier system 60.

A land communication system 62 may further be included that is a conventional land-based telecommunications network connected to one or more landline telephones and connects the wireless carrier system 60 to the remote transportation system 52. For example, the land communication system 62 may include a public switched telephone network (PSTN) such as that used to provide hardwired telephony, packet-switched data communications, and the Internet infrastructure. One or more segments of the land communication system 62 can be implemented through the use of a standard wired network, a fiber or other optical network, a cable network, power lines, other wireless networks such as wireless local area networks (WLANs), or networks providing broadband wireless access (BWA), or any combination thereof. Furthermore, the remote transportation system 52 need not be connected via the land communication system 62, but can include wireless telephony equipment so that it can communicate directly with a wireless network, such as the wireless carrier system 60.

Although only one user device 54 is shown in FIG. 2, embodiments of the operating environment 50 can support any number of user devices 54, including multiple user devices 54 owned, operated, or otherwise used by one person. Each user device 54 supported by the operating environment 50 may be implemented using any suitable hardware platform. In this regard, the user device 54 can be realized in any common form factor including, but not limited to: a desktop computer; a mobile computer (e.g., a tablet computer, a laptop computer, or a netbook computer); a smartphone; a video game device; a digital media player; a piece of home entertainment equipment; a digital camera or video camera; a wearable computing device (e.g., smart watch, smart glasses, smart clothing); or the like. Each user device 54 supported by the operating environment 50 is realized as a computer-implemented or computer-based device having the hardware, software, firmware, and/or processing logic needed to carry out the various techniques and methodologies described herein. For example, the user device 54 includes a microprocessor in the form of a programmable device that includes one or more instructions stored in an internal memory structure and applied to receive binary input to create binary output. In some embodiments, the user device 54 includes a GPS module capable of receiving GPS satellite signals and generating GPS coordinates based on those signals. In other embodiments, the user device 54 includes cellular communications functionality such that the device carries out voice and/or data communications over the communication network 56 using one or more cellular communications protocols, as are discussed herein. In various embodiments, the user device 54 includes a visual display, such as a touch-screen graphical display, or other display.

The remote transportation system 52 includes one or more backend server systems, which may be cloud-based, network-based, or resident at the particular campus or geographical location serviced by the remote transportation system 52. The remote transportation system 52 can be manned by a live advisor, or an automated advisor, or a combination of both. The remote transportation system 52 can communicate with the user devices 54 and the autonomous vehicles 10a, 10b . . . 10n to schedule rides, dispatch autonomous vehicles 10a, 10b . . . 10n, and the like. In various embodiments, the remote transportation system 52 stores account information such as subscriber authentication information, vehicle identifiers, profile records, behavioral patterns, and other pertinent subscriber information.

In accordance with a typical use case workflow, a registered user of the remote transportation system 52 can create a ride request via the user device 54. The ride request will typically indicate the passenger's desired pickup location (or current GPS location), the desired destination location (which may identify a predefined vehicle stop and/or a user-specified passenger destination), and a pickup time. The remote transportation system 52 receives the ride request, processes the request, and dispatches a selected one of the autonomous vehicles 10a-10n (when and if one is available) to pick up the passenger at the designated pickup location and at the appropriate time. The remote transportation system 52 can also generate and send a suitably configured confirmation message or notification to the user device 54, to let the passenger know that a vehicle is on the way.

As can be appreciated, the subject matter disclosed herein provides certain enhanced features and functionality to what may be considered as a standard or baseline autonomous vehicle 10 and/or an autonomous vehicle based remote transportation system 52. To this end, an autonomous vehicle and autonomous vehicle based remote transportation system can be modified, enhanced, or otherwise supplemented to provide the additional features described in more detail below.

Figure 3:
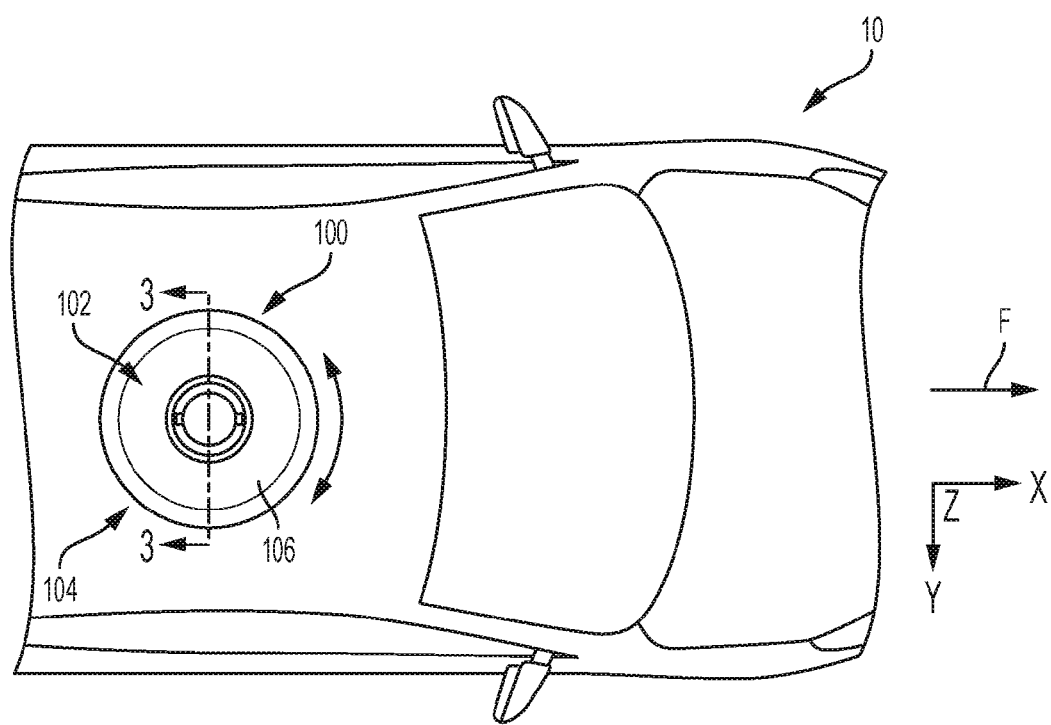
FIG. 3 is a top view of the sensor mounting system of the autonomous vehicle of FIG. 1 coupled to a roof of the autonomous vehicle of FIG. 1, in accordance with various embodiments.

Referring now to FIG. 3, the sensor mounting system 100 is shown in greater detail in relation to the autonomous vehicle 10. As discussed, in this example, the sensor mounting system 100 is coupled to the roof 14a of the autonomous vehicle 10. Generally, the sensor mounting system 100 includes a first portion or gimbal 102 and a second portion or turret 104, which extend along a longitudinal axis L. The gimbal 102 is movable about two degrees of freedom relative to the autonomous vehicle 10, and the turret 104 is movable about a single degree of freedom relative to the autonomous vehicle 10. In this example, the gimbal 102 is movable about the Y-axis (i.e. rotatable up and down in a vertical direction relative to a forward driving direction F of the autonomous vehicle 10) and is movable about the Z-axis (i.e. rotatable left and right relative to the forward driving direction F of the autonomous vehicle 10). The turret 104 is movable about the Z-axis (i.e. rotatable left and right relative to the forward driving direction F of the autonomous vehicle 10). In one example, the gimbal 102 is movable approximately 360 degrees about the Y-axis, and is movable approximately 360 degrees about the Z-axis. In another example, the turret 104 is movable approximately 360 degrees about the Z-axis. Thus, the gimbal 102 is independently movable in two degrees of freedom relative to the autonomous vehicle 10 and the turret 104, and the turret 104 is independently movable in a single degree of freedom relative to the gimbal 102 and the autonomous vehicle 10. It should be noted that even though the turret 104 is described herein as being rotatable about the Z-axis a full 360 degrees, it should be understood that the turret 104 may rotate less than 360 degrees, if desired.

As will be discussed, one or more of the sensing devices 40a, 40b . . . 40n of the sensor system 28 are coupled to the sensor mounting system 100 so as to be movable about the respective Y-axis, Z-axis or both axes. Generally, one or more long-range sensing devices 40a, 40b . . . 40n are coupled to the gimbal 102, while one or more short-range sensing devices 40a, 40b . . . 40n are coupled to the turret 104. Thus, for example, a lidar may be coupled to the gimbal 102, and one or more short-range cameras may be coupled to the turret 104. The one or more sensing devices 40a, 40b . . . 40n coupled to the sensor mounting system 100 observe the environment surrounding the autonomous vehicle 10 and generate sensor signals based thereon. These sensor signals generated by the sensing devices 40a, 40b . . . 40n are communicated to the controller 34 via any suitable communication architecture that facilitates the transfer of data, including a wired or a wireless communication architecture. Thus, it will be understood that the use of a wireless connection illustrated herein is merely exemplary, as the sensor signals generated by the sensing devices 40a, 40b . . . 40n may also be communicated to the controller 34 via one or more wired connections. In one example, with reference to FIG. 4, the sensor mounting system 100 includes the gimbal 102 and the turret 104.

In this example, the gimbal 102 is coupled to the turret 104 so as to be spaced apart from a first surface 106 of the turret 104. The gimbal 102 includes one or more of the sensing devices 40a, 40b . . . 40n, such as the sensing device 40a, the sensing device 40b and the sensing device 40c. While the sensing devices 40a, 40b, 40c are illustrated herein as being arranged in a staggered or offset configuration, the sensors may be arranged in parallel or series as needed for packaging within the gimbal 102. Generally, as each of the sensing devices 40a, 40b, 40c are contained within and supported by the gimbal 102, each of the sensing devices 40a, 40b, 40c have a similar field of view 41a, 41b, 41c relative to the autonomous vehicle 10. The gimbal 102 enables the sensing devices 40a, 40b, 40c to be moved substantially simultaneously relative to the autonomous vehicle 10 and the turret 104 about the Z-axis and Y-axis. In this example, the gimbal 102 may comprise a gyrostabilized gimbal and may include an inertial measurement unit (IMU), and the sensor signals from the IMU may be processed by the processor 44 and may be used to control the movement of the gimbal 102 relative to the autonomous vehicle 10 and the turret 104.

Figure 5:
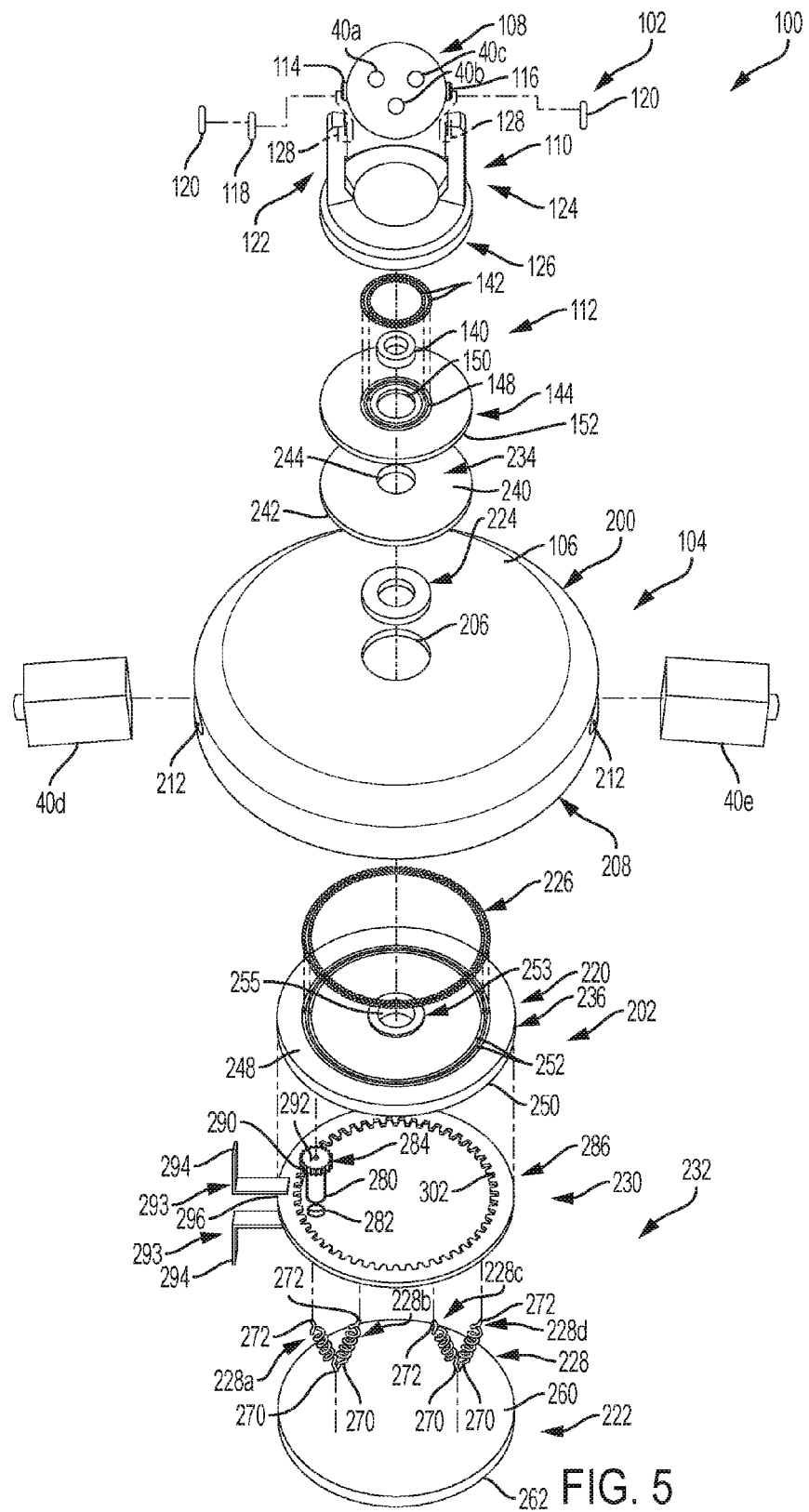
FIG. 5 is an expanded view of the sensor mounting system of the autonomous vehicle of FIG. 1, in accordance with various embodiments.

With reference to FIG. 5, the gimbal 102 includes a housing 108, a support 110 and a mounting assembly 112. The housing 108 is substantially spherical, and may comprise a clam-shell housing or the like. The housing 108 may be composed of any material, such as a metal, metal alloy, or polymer, for example, a carbon fiber reinforced polymer, and may be formed via a suitable technique, such as molding, casting, forging, machining, selective metal sintering, etc. The housing 108 receives and supports the sensing devices 40a, 40b, 40c. The housing 108 may define one or more support structures for mounting the sensing devices 40a, 40b, 40c within the housing 108, such as struts, brackets, balancing weights, etc. The housing 108 includes a first pivot post 114 and a second pivot post 116, which each extend radially outwardly from the housing 108. The first pivot post 114 is opposite the second pivot post 116 and couples the housing 108 to the support 110.

In one example, a first slip ring 118 and one or more bearings 120 are coupled about each of the first pivot post 114 and the second pivot post 116. In this example, the first slip ring 118 is coupled to the first pivot post 114; however, the first slip ring 118 may be coupled to the second pivot post 116 or each of the first pivot post 114 and the second pivot post 116 may include the first slip ring 118. The first slip ring 118 is an optical or mechanical slip ring, which enables signals from the sensing devices 40a, 40b, 40c to be communicated via fiber optics or mechanically from the housing 108 through the support 110. In addition, the first slip ring 118 transmits signals to the controller 34 regarding the position of the gimbal 102 about the Z-axis. The first slip ring 118 also enables power to be transferred via fiber optics or mechanically from the housing 108 through the support 110. The first slip ring 118 may comprise a single channel, a multiple channel optical or mechanical slip ring, depending upon the sensing devices 40a, 40b . . . 40n coupled to the gimbal 102 and disposed within the housing 108.

The one or more bearings 120 are coupled about the respective one of the first pivot post 114 and the second pivot post 116 to assist in the rotation of the housing 108 relative to the support 110. In this example, a single bearing 120 is shown coupled to each of the first pivot post 114 and the second pivot post 116; however, it will be understood that any number of bearings 120 may be employed. The bearings 120 generally comprise a rolling element bearing; however, any type of bearing or bushing may be employed to facilitate relative rotational movement of the housing 108 relative to the support 110. Moreover the one or more bearings 120 may include a respective seal or environmental barrier to further inhibit the ingress of debris and environmental elements (i.e. rain, sleet, snow, dirt, etc.) between the first pivot post 114, the second pivot post 116 and the respective recess 128.

The support 110 includes a first arm 122, a second arm 124 and a base 126. The support 110 is generally U-shaped; however, the support 110 may have any desired shape. The support 110 may be composed of any material, such as a metal, metal alloy, or polymer, for example, a carbon fiber reinforced polymer, and may be formed via a suitable technique, such as molding, casting, forging, machining, selective metal sintering, etc. The support 110 may be formed as a unitary or one-piece structure, or may be formed as discrete components that are assembled together, via welding, mechanical fasteners, etc., to form the support 110. The first arm 122 is spaced apart from the second arm 124 along the base 126, and the housing 108 is received between the first arm 122 and the second arm 124. Each of the first arm 122 and the second arm 124 define a recess 128, which receives a respective one of the first pivot post 114 and the second pivot post 116 to enable the housing 108 to move or pivot relative to the support 110. Each of the recesses 128 may also include a raceway for the respective bearing 120, and the recess 128 of the first arm 122 may include a counterbore or similar feature for receiving the first slip ring 118. A fiber optic cable may extend through the first arm 122 to the recess 128 of the first arm 122 to facilitate the transfer of data from the sensing devices 40a, 40b, 40c disposed within the housing 108.

Figure 6:
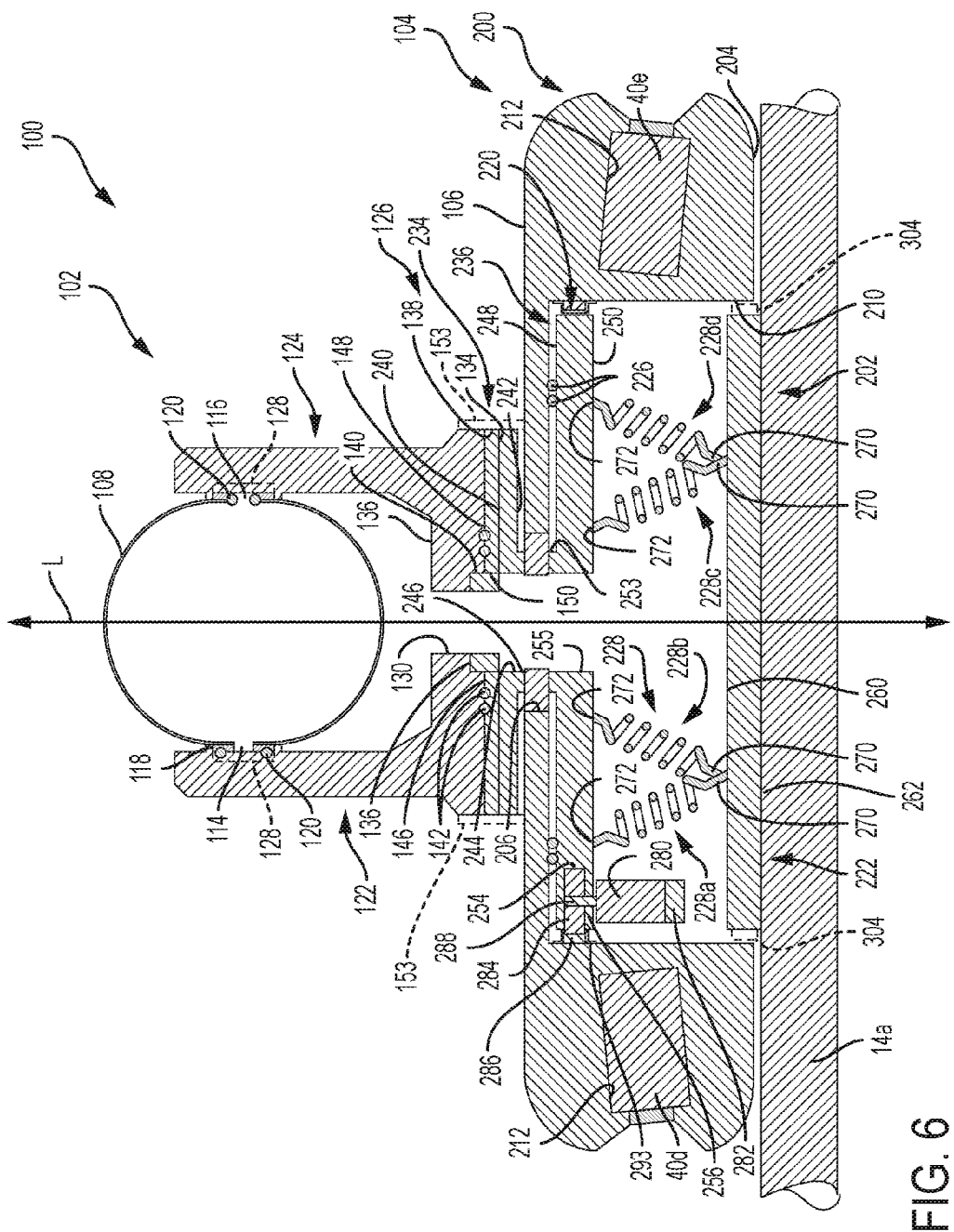
FIG. 6 is a cross-sectional view of the sensor mounting system of the autonomous vehicle of FIG. 1, taken along line 3-3 of FIG. 3, in accordance with various embodiments.

In this example, the base 126 is annular; however, the base 126 may have any desired shape. The base 126 defines a central bore 130, which extends through the base 126 along a central axis of the base 126. The central bore 130 may receive one or more wired connections, if provided, for transmitting the signals generated by the sensing devices 40a, 40b, 40c to the controller 34. With reference to FIG. 6, the base 126 further defines a counterbore 132 about the central bore 130 at a second end 134, which is opposite a first end 136. The base 126 also defines an annular recess 138 at the second end 134, which surrounds or circumscribes the counterbore 132. Generally, the first arm 122 and the second arm 124 are coupled to the first end 136. The counterbore 132 and the annular recess 138 each receive a portion of the mounting assembly 112.

The mounting assembly 112 couples the gimbal 102 to the turret 104. In one example, the mounting assembly 112 includes a second slip ring 140, one or more second bearings 142 and a mounting flange 144. The second slip ring 140 is received within the counterbore 132 and the mounting flange 144. The second slip ring 140 enables the base 126, and thus, the gimbal 102 to move relative to the turret 104 and the autonomous vehicle 10 about the Z-axis. The second slip ring 140 is also an optical or mechanical slip ring, which enables signals from the housing 108 to be communicated via fiber optics or mechanically from the support 110 to the turret 104 and/or externally from the sensor mounting system 100 to the controller 34. The second slip ring 140 also transmits signals to the controller 34 regarding the position of the gimbal 102 about the X-axis. The second slip ring 140 may comprise a single channel, a multiple channel optical or mechanical slip ring, depending upon the data communicated through the second slip ring 140.

The one or more second bearings 142 are coupled between the base 126 and the mounting flange 144 to assist in the rotation of the base 126 relative to the mounting flange 144. In this example, two second bearings 142 are shown coupled to each of the base 126 and the mounting flange 144; however, it will be understood that any number of second bearings 142 may be employed. In this example, the second bearings 142 may be received in a respective raceway defined by a first surface 146 of the annular recess 138 and a first surface 148 of the mounting flange 144. The second bearings 142 generally comprise a rolling element bearing; however any type of bearing or bushing may be employed to facilitate relative rotational movement of the base 126 relative to the mounting flange 144. Moreover the one or more second bearings 142 may include a respective seal or environmental barrier to further inhibit the ingress of debris and environmental elements (i.e. rain, sleet, snow, dirt, etc.) between the base 126 and the mounting flange 144.

Figure 4:
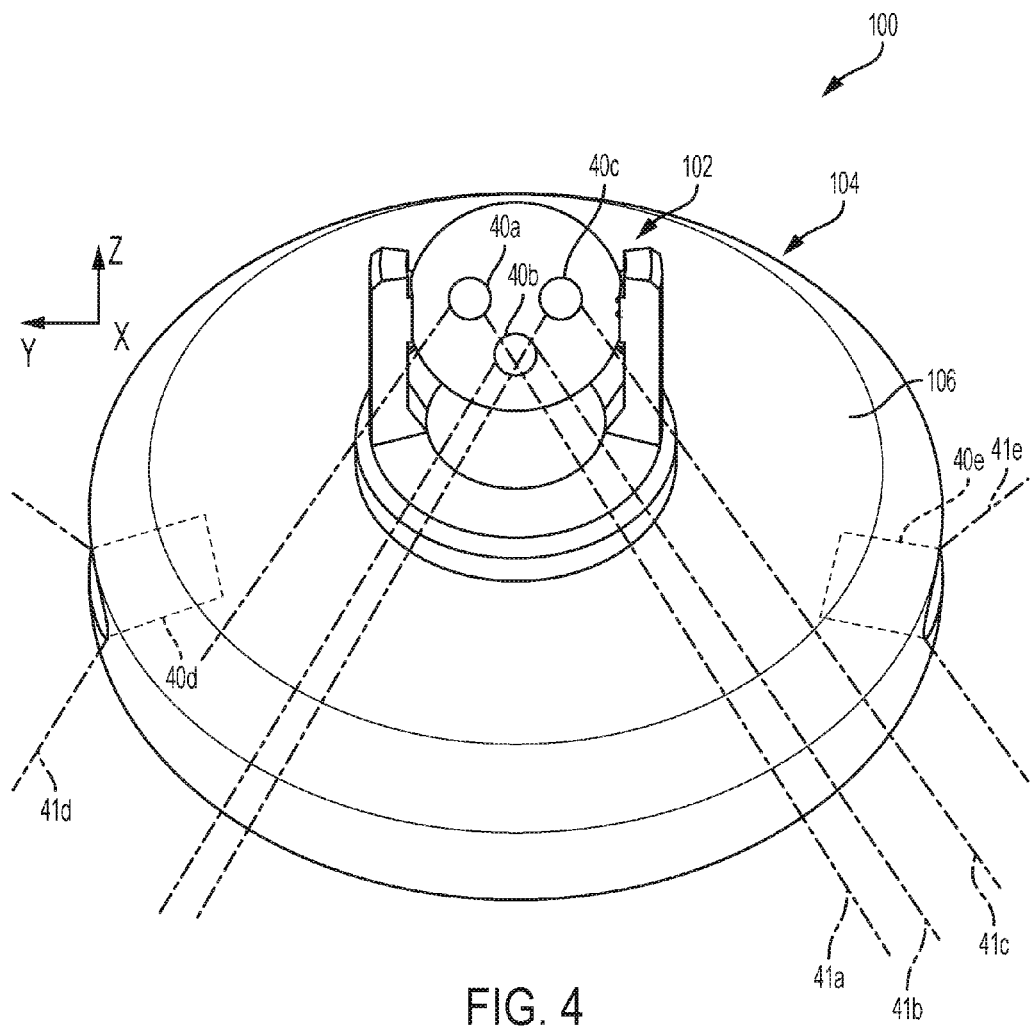
FIG. 4 is a perspective view of the sensor mounting system of FIG. 1, in accordance with various embodiments.

The mounting flange 144 is sized to be received within the annular recess 138 of the base 126. The mounting flange 144 may be composed of any material, such as a metal, metal alloy, or polymer, for example, a carbon fiber reinforced polymer, and may be formed via a suitable technique, such as molding, casting, forging, machining, selective metal sintering, etc. Generally, the mounting flange 144 couples the gimbal 102 to the first surface 106 of the turret 104, while enabling the motion of the base 126 relative to the turret 104 and the autonomous vehicle 10 about the Z-axis (FIG. 4). In one example, the mounting flange 144 includes a bore 150 that receives the second slip ring 140 so that the base 126 is rotatable about the second slip ring 140. The second slip ring 140 is generally fixedly coupled to the bore 150, via welding, adhesives, mechanical fasteners, press-fit, etc. A second surface 152 opposite the first surface 148 of the mounting flange 144 is coupled to the turret 104. In one example, the mounting flange 144 is fixedly coupled to the turret 104, via welding, adhesives, mechanical fasteners, etc.

Optionally, with reference to FIG. 6, the mounting assembly 112 includes an environmental barrier element, such as a first seal 153. The first seal 153 substantially prevents the ingress of debris and environmental elements (i.e. rain, sleet, snow, dirt, etc.) into the space defined between the base 126 and the turret 104. In one example, the first seal 153 is an elastomeric gasket seal coupled about the perimeter of the base 126 to permit the movement of the gimbal 102 and the turret housing 200 while substantially prohibiting the ingress of debris and environmental elements. It should be understood, however, that any suitable environmental barrier may be employed and coupled to the base 126 and/or a turret housing 200 of the turret 104 via any desired technique.

The turret 104 is coupled to the gimbal 102. In this example, the turret 104 includes the turret housing 200, a turret mounting assembly 202 and one or more of the sensing devices 40a, 40b . . . 40n. In this example, the turret 104 includes two sensing devices 40d, 40e. The sensing devices 40d, 40e are generally short-range sensing devices, such as a short-range camera. It should be noted, however, that any sensing device 40 may be coupled to the turret 104, and moreover, while two sensing devices 40d, 40e are illustrated herein as being coupled to the turret 104, the turret 104 may include any number of sensing devices 40 coupled to the turret housing 200 about a perimeter of the turret housing 200. The sensing devices 40d, 40e are coupled to the turret housing 200 so as to be spaced apart about a perimeter or circumference of the turret housing 200, and in this example, the sensing devices 40d, 40e are substantially diametrically opposed. It should be noted that the sensing devices 40d, 40e may be positioned at any desired location about the perimeter or circumference of the turret housing 200.

As discussed, the sensing devices 40d, 40e are coupled to the turret housing 200. The turret housing 200 is substantially cylindrical; however, the turret housing 200 may have any shape and need not comprise a complete cylinder. The turret housing 200 may be composed of any material, such as a metal, metal alloy, or polymer, for example, a carbon fiber reinforced polymer, and may be formed via a suitable technique, such as molding, casting, forging, machining, selective metal sintering, etc. The turret housing 200 includes the first surface 106, a second surface 204 (FIG. 6), a turret center bore 206 defined through the first surface 106 and a sidewall 208.

The first surface 106 is positioned adjacent to the base 126 of the gimbal 102 when the gimbal 102 is coupled to the turret 104. The first surface 106 is generally planar, and may include a chamfered radius about a perimeter of the first surface 106 adjacent to the sidewall 208.

With reference to FIG. 6, the turret center bore 206 is defined through the first surface 106, and is in communication with a counterbore 210 defined through the second surface 204. The turret center bore 206 receives a portion of the turret mounting assembly 202 and cooperates with the turret mounting assembly 202 to rotatably couple the turret housing 200, and thus, the sensing devices 40d, 40e to the autonomous vehicle 10. In addition, the second surface 204 and the roof 14a of the autonomous vehicle 10 may be configured such that the second surface 204 does not encounter mechanical and/or environmental obstructions through the rotation of the turret 104 relative to the autonomous vehicle 10, and in one example, may be configured to account for potential dirt, water, debris, etc. encountered during the operation of the autonomous vehicle 10.

The second surface 204 includes the counterbore 210. The counterbore 210 is defined through the second surface 204 so as to receive a portion of the turret mounting assembly 202. Generally, the turret 104 is coupled to the autonomous vehicle 10 by the turret mounting assembly 202 such that the second surface 204 is spaced a distance apart from the roof 14a of the autonomous vehicle 10.

The sidewall 208 extends between and couples the first surface 106 to the second surface 204. The sidewall 208 defines one or more receptacles 212, which each receive a respective one of the sensing devices 40d, 40e. The sensing devices 40d, 40e may be coupled to the receptacles 212 of the turret housing 200 via any technique, such as one or more mechanical fasteners, welding, etc. In addition, the receptacles 212 and/or the respective sensing devices 40d, 40e may include weather proofing or sealing to inhibit the ingress of debris and environmental elements (i.e. rain, sleet, snow, dirt, etc.) into the receptacle 212. The sidewall 208 may include any number of receptacles 212 for receiving any number of the sensing devices 40, and moreover, multiple sensing devices 40 may be received in a single receptacle 212, if desired. The sidewall 208 is also coupled to a portion of the turret mounting assembly 202.

Generally, the sensing devices 40d, 40e are in wired communication with a portion of the turret mounting assembly 202 to transmit sensor signals generated by the observations of the environment surrounding the autonomous vehicle 10 to the controller 34. Alternatively, the sensing devices 40d, 40e may be in wireless communication with the controller 34. It should be understood, however, that the sensing devices 40d, 40e may transmit sensor signals to any other controller associated with the autonomous vehicle 10. Moreover, the sensor mounting system 100 may include a separate processor or processing module that receives and processes the sensor signals, and this processor or processing module may communicate the processed signals to the controller 34 over a wired or wireless communication medium. In the example of the sensor mounting system 100 including the processor or processing module, the processor or processing module may be disposed within a space defined by the turret mounting assembly 202, and may be in communication with each of the first slip ring 118, the second slip ring 140 and a third slip ring 224 to receive the sensor signals.

With reference to FIG. 5, the turret mounting assembly 202 includes a first mounting plate 220, a second mounting plate 222, the third slip ring 224, one or more third bearings 226, one or more isolation members 228 and a turret drive system 230. The first mounting plate 220, the second mounting plate 222 and the one or more isolation members 228 cooperate to define a spring plate 232, which isolates the sensor mounting system 100 from vibrations and/or forces experienced by the operation of the autonomous vehicle 10, and thus, isolates the one or more sensing devices 40a-40e of the gimbal 102 and the turret 104 from these vibrations and/or forces. In one example, the spring plate 232 is tuned to isolate the gimbal 102 and the turret 104 from a frequency associated with the operation of the autonomous vehicle 10, for example, a natural frequency of the autonomous vehicle 10. Generally, the turret housing 200 substantially surrounds the spring plate 232. In addition, the turret mounting assembly 202 may include an inertial measurement unit (IMU), and the sensor signals from the IMU may be processed by the processor 44 and used to control the movement of the turret 104 relative to the autonomous vehicle 10 and the gimbal 102.

The first mounting plate 220 is coupled to the gimbal 102. The first mounting plate 220 may be composed of any material, such as a metal, metal alloy, or polymer, for example, a carbon fiber reinforced polymer, and may be formed via a suitable technique, such as molding, casting, forging, machining, selective metal sintering, etc. The first mounting plate 220 includes a collar 234 spaced apart from a first plate body 236 by the third slip ring 224 (FIG. 6). The collar 234 is annular, and is sized to correspond to the mounting flange 144. In one example, the collar 234 may have a diameter larger than the mounting flange 144; however, the collar 234 and the mounting flange 144 may have the same diameter. The collar 234 includes a first collar surface 240, which is fixedly coupled to the mounting flange 144 to couple the gimbal 102 to the turret 104. With reference to FIG. 6, the collar 234 includes a second collar surface 242 substantially opposite the first collar surface 240 and a collar bore 244 defined through the collar 234 from the first collar surface 240 to the second collar surface 242. The collar bore 244 is substantially coaxial with the central bore 130 of the base 126 to enable fiber optical cables and/or other wired connections to pass from the gimbal 102 to the turret 104. The second collar surface 242 includes a projection 246. The projection 246 extends outwardly from the second collar surface 242 and provides clearance for the rotation of the turret housing 200 about the first mounting plate 220. The projection 246 is fixedly coupled to the third slip ring 224, via mechanical fasteners, etc.

The first plate body 236 is annular, and includes a first body surface 248 opposite a second body surface 250. With reference to FIG. 5, the first body surface 248 defines one or more raceways 252, which extend about a circumference of the of the first body surface 248. Each of the one or more raceways 252 receives a respective one of the one or more third bearings 226. With reference to FIG. 6, the first body surface 248 also defines a central body bore 253 and a plate projection 255. The central body bore 253 is defined through the first plate body 236 from the first body surface 248 to the second body surface 250 along a center line of the first plate body 236. The central body bore 253 is coaxial with the collar bore 244 and the central bore 130 of the base 126. The central body bore 253 is also coaxial with the turret center bore 206 of the turret housing 200. The central body bore 253 enables fiber optical cables and/or other wired connections to pass from the gimbal 102 to the turret 104.

The plate projection 255 cooperates with the projection 246 to provide clearance for the rotation of the turret housing 200 about the first mounting plate 220. The plate projection 255 extends outwardly from the first body surface 248. The plate projection 255 is fixedly coupled to the third slip ring 224, via mechanical fasteners, etc.

With reference back to FIG. 6, the second body surface 250 is coupled to the one or more isolation members 228. The second body surface 250 may include one or more coupling features, such as brackets, grooves, notches, etc. (not shown) to assist in coupling the one or more isolation members 228 to the second body surface 250. Further, the second body surface 250 may define one or more recesses that serve as seats for the one or more isolation members 228.

The first plate body 236 also defines a chamber 254 that receives a portion of the turret drive system 230. The chamber 254 is defined between the first body surface 248 and the second body surface 250, and may extend along a portion of the perimeter or circumference of the first plate body 236. In this example, a bore 256 is defined through the second body surface 250 so as to be in communication with the chamber 254. The bore 256 also receives a portion of the turret drive system 230.

The second mounting plate 222 is annular, and includes a first plate surface 260 opposite a second plate surface 262. The second mounting plate 222 may be composed of any material, such as a metal, metal alloy, or polymer, for example, a carbon fiber reinforced polymer, and may be formed via a suitable technique, such as molding, casting, forging, machining, selective metal sintering, etc. The first plate surface 260 is coupled to the one or more isolation members 228. The first plate surface 260 may include one or more coupling features, such as brackets, grooves, notches, etc. (not shown) to assist in coupling the one or more isolation members 228 to the first plate surface 260. Further, the first plate surface 260 may define one or more recesses that serve as seats for the one or more isolation members 228.

The second plate surface 262 is coupled to the roof 14a of the autonomous vehicle 10. The second plate surface 262 generally defines one or more bores that receive one or more fasteners, such as bolts, to couple the second plate surface 262 to the roof 14a of the autonomous vehicle 10. It should be noted that any technique may be used to couple the second plate surface 262 to the autonomous vehicle 10, and including, but not limited to, welding, etc.

The third slip ring 224 is fixedly coupled to the projection 246 and the plate projection 255; and is rotatably coupled to the turret housing 200. The third slip ring 224 enables the turret housing 200 to move relative to the gimbal 102 and the autonomous vehicle 10 about the Z-axis (FIG. 3). The third slip ring 224 is also an optical or mechanical slip ring, which enables signals from the sensing devices 40d, 40e to be communicated via fiber optics or mechanically from the sensor mounting system 100 to the controller 34. The third slip ring 224 may comprise a single channel, a multiple channel optical or mechanical slip ring, depending upon the data communicated through the third slip ring 224.

The one or more third bearings 226 are coupled between the first body surface 248 and the turret housing 200 to assist in the rotation of the turret housing 200 relative to the turret mounting assembly 202. In this example, two third bearings 226 are shown coupled to the first body surface 248 in the raceways 252; however, it will be understood that any number of third bearings 226 may be employed. The third bearings 226 generally comprise a rolling element bearing; however, any type of bearing or bushing may be employed to facilitate relative rotational movement of the turret housing 200 relative to the turret mounting assembly 202. Moreover the one or more third bearings 226 may include a respective seal or environmental barrier to further inhibit the ingress of debris and environmental elements (i.e. rain, sleet, snow, dirt, etc.) between the turret housing 200 and the first mounting plate 220.

In various embodiments, the turret mounting assembly 202 may also include a position sensor, including, but not limited to, an encoder. In one example, the position sensor observes a position of the turret housing 200 and generates sensor signals based on this observation, which are communicated wirelessly or through a wired communication medium to the controller 34. In this example, the position sensor may be coupled within the space defined by the spring plate 232, and for example, may be coupled to the first mounting plate 220. In addition, while the turret 104 is described and illustrated herein as having a single degree of freedom, it will be understood that the turret 104 may have several multiple degree of freedom components. In another exemplary multi-axis embodiment, the turret 104 may be modified and sub-contained in the housing 108, as discussed with regard to FIG. 9.

The one or more isolation members 228 generally inhibit the transfer of forces and/or vibrations to the sensor mounting system 100 that are introduced by the movement of the autonomous vehicle 10. In one example, the one or more isolation members 228 are coil compression springs; however, any type of biasing member may be employed to isolate the forces and vibrations encountered by the operation of the autonomous vehicle 10, such as a Belleville spring, leaf spring, etc. Moreover, while the one or more isolation members 228 are illustrated and described herein as comprising tension springs for isolating the forces and/or vibrations experienced by the sensor mounting system 100 through the operation of the autonomous vehicle 10, it will be understood that other devices may be employed to isolate the sensor mounting system 100 from forces and/or vibrations experienced by the autonomous vehicle 10, including, but not limited to, one or more shock absorbers, one or more energy absorbing devices, one or more damping devices, etc. Further, the one or more isolation members 228 may comprise a device with variable stiffness, such as an air spring, a tunable damper (e.g. a magnetorheological damper), etc.

In this example, four isolation members 228*a-d* are coupled between the first mounting plate 220 and the second mounting plate 222 to inhibit the transfer of forces and/or vibrations experienced during the operation of the autonomous vehicle 10 to the sensor mounting system 100. It should be understood that while four isolation members 228*a-d* are illustrated herein, the one or more isolation members 228 may include any number of isolation members coupled between the first mounting plate 220 and the second mounting plate 222 to define the spring plate 232, including a single isolation member. The isolation members 228*a-d* are substantially diametrically opposed from each other along the diameter of each of the first mounting plate 220 and the second mounting plate 222; however, the isolation members 228*a-d* may be coupled between the first mounting plate 220 and the second mounting plate 222 at any desired orientation. For example, the one or more isolation members 228 may be spaced apart about a circumference of the first mounting plate 220 and the second mounting plate 222 such that a respective one of the one or more isolation members 228 is coupled at about 90 degrees, 180 degrees, 270 degrees and 360 degrees relative to the circumferences of the first mounting plate 220 and the second mounting plate 222.

Each of the isolation members 228*a-d* includes a first end 270 and a second end 272. In this example, the isolation members 228*a-d* are arranged in pairs, such that the first ends 270 of adjacent isolation members 228*a*, 228*b*; 228*c*, 228*d* are coupled together; however, the first ends 270 of the adjacent isolation members 228*a*, 228*b*; 228*c*, 228*d* may be spaced apart along the first plate surface 260 of the second mounting plate 222. The first ends 270 are each coupled to the first plate surface 260 of the second mounting plate 222, and the second ends 272 are each coupled to the second body surface 250 of the first mounting plate 220. The first ends 270 and the second ends 272 may be coupled to the first plate surface 260 and the second body surface 250 via any technique, such as welding, mechanical fasteners, etc. Moreover, only a respective one of the first ends 270 and the second ends 272 may be coupled to the respective one of the first plate surface 260 and the second body surface 250, and the other of the first plate surface 260 and the second body surface 250 may define a spring seat. Generally, the second ends 272 are spaced apart from each other about the second body surface 250; however, the second ends 272 may be next to, adjacent to or coupled together at the second body surface 250, if desired.

The turret drive system 230 moves the turret housing 200 relative to the gimbal 102 and the autonomous vehicle 10. In one example, the turret drive system 230 includes a motor 280, a sensor 282, a drive gear 284 and a driven ring gear 286. The motor 280 is responsive to one or more control signals received from the controller 34 to move the turret housing 200 relative to the autonomous vehicle 10 and gimbal 102. The motor 280 is in communication with the controller 34 over a suitable communication architecture, which enables the transfer of power, signals and commands. In one example, the motor 280 is a DC motor; however, any suitable power supply may be employed. The motor 280 includes an output shaft 288. The output shaft 288 passes through the bore 256 of the first mounting plate 220 and is rotatable within the bore 256. The motor 280 is coupled to or mounted on the second body surface 250 such that the output shaft 288 may pass through the bore 256, and in one example, the motor 280 is coupled to the second body surface 250 via one or more mechanical fasteners, etc.

The sensor 282 is coupled to the motor 280. In one example, the sensor 282 is an encoder, such as a rotary encoder, which observes a position of the output shaft 288 and generates sensor signals based the observation. The sensor 282 is in communication with the controller 34 over a suitable communication architecture that facilitates the transfer of power, signals and commands. The sensor signals generated by the sensor 282 are communicated to the controller 34, and the processor 44 of the controller 34 determines an amount of revolution of the output shaft 288 based on the sensor signals. Based on the determined amount of revolution, and a known ratio between the drive gear 284 and the driven ring gear 286, the processor 44 determines a location or position of the turret housing 200 relative to the autonomous vehicle 10.

It should be noted that the use of the sensor signals generated by the sensor 282 is merely one exemplary method for determining a location or position of the turret housing 200. In this regard, the second body surface 250 may include a bar code, which may be coupled to the second body surface 250 about a perimeter of the second body surface 250, via an adhesive, for example. A sensor may be coupled to the first plate surface 260 to observe the bar code and generated sensor signals based on the observation. The generated sensor signals may be communicated to the controller 34, and the processor 44 of the controller 34 may determine a position of the turret housing 200 based on the sensor signals.

As a further alternative, a sensor gear may be coupled to the driven ring gear 286, and may be driven by the rotation of the driven ring gear 286. The sensor gear may be coupled to a sensor via a shaft, for example, a potentiometer, such that the rotation of the sensor gear generates a signal. The signals generated by the sensor may be communicated to the controller 34, and the processor 44 of the controller 34 may determine a position of the turret housing 200 based on the sensor signals.

The drive gear 284 is received within the chamber 254. The drive gear 284 may be composed of any material, such as a metal, metal alloy, or polymer, for example, a carbon fiber reinforced polymer, and may be formed via a suitable technique, such as molding, casting, forging, machining, selective metal sintering, etc. With reference to FIG. 5, the drive gear 284 includes a plurality of gear teeth 290 about a perimeter or circumference of the drive gear 284. The drive gear 284 also includes a bore 292, which is coupled to the output shaft 288 to enable the drive gear 284 to be driven by the output shaft 288 upon activation of the motor 280.

The driven ring gear 286 is coupled to the turret housing 200, and is driven by the drive gear 284 to move the turret housing 200 relative to the autonomous vehicle 10 and the gimbal 102. In one example, the driven ring gear 286 is coupled to the counterbore 210 of the turret housing 200 via a pair of mounting brackets 293; however, any technique may be used to couple the driven ring gear 286 to the turret housing 200. In this example, each one of the pair of mounting brackets 293 is generally L-shaped, and has a first end 294 coupled to the counterbore 210 of the turret housing 200, via a mechanical fastener, welding, adhesives, etc., and a second end 296 coupled to the driven ring gear 286, via a mechanical fastener, welding, adhesives, etc. Generally, a first one of the pair of mounting brackets 293 is coupled to a first side 298 of the driven ring gear 286, and a second one of the pair of mounting brackets 293 is coupled to a second, opposite side 300 of the driven ring gear 286. The pair of mounting brackets 293 cooperate to fixedly couple the driven ring gear 286 to the turret housing 200.

The driven ring gear 286 includes a plurality of gear teeth 302 defined about an inner perimeter or inner circumference of the driven ring gear 286. The driven ring gear 286 may be composed of any material, such as a metal, metal alloy, or polymer, for example, a carbon fiber reinforced polymer, and may be formed via a suitable technique, such as molding, casting, forging, machining, selective metal sintering, etc. The plurality of gear teeth 302 meshingly engage with the plurality of gear teeth 290 of the drive gear 284 such that the rotation of the drive gear 284 by the output shaft 288 drives the driven ring gear 286, which in turn moves the turret housing 200 relative to the autonomous vehicle 10 and the gimbal 102. It should be noted that while the driven ring gear 286 is illustrated and described herein as being discrete from the turret housing 200, it will be understood that the driven ring gear 286 may be formed integrally with the turret housing 200, if desired.

While the turret drive system 230 is described and illustrated herein as comprising the motor 280 coupled to the first mounting plate 220 to indirectly drive or move the turret housing 200 via a gear train formed by the drive gear 284 and the driven ring gear 286, it will be understood that the present disclosure is not so limited. In this regard, any drive system may be employed to move the turret housing 200 relative to the spring plate 232. For example, a bevel gear may be coupled to an output shaft of the motor and arranged to directly drive the driven ring gear 286. Moreover, a first mounting plate associated with the spring plate 232 may include a plurality of gear teeth that meshingly engage with the driven ring gear 286, and a motor may be coupled to the first mounting plate to drive or move the turret housing 200 via a rotation of the first mounting plate. As a further example, a mechanical linkage or mechanical coupling may be connected between the driven ring gear 286 and the turret 104 to enable relative motion.

Optionally, with reference to FIG. 6, the turret mounting assembly 202 includes an environmental barrier element, such as a seal 304. The seal 304 substantially prevents the ingress of debris and environmental elements (i.e. rain, sleet, snow, dirt, etc.) into the space defined between the first mounting plate 220 and the second mounting plate 222. In one example, the seal 304 is an elastomeric seal that is applied via adhesives about the perimeter of the second mounting plate 222 to permit the movement of the turret housing 200 while substantially prohibiting the ingress of debris and environmental elements. It should be understood, however, that any suitable environmental barrier may be employed and coupled to the second mounting plate 222 via any desired technique.

With reference to FIGS. 5 and 6, in order to assemble the sensor mounting system 100, in one example, the sensing devices 40d, 40e may be coupled to the receptacles 212 of the turret housing 200. The driven ring gear 286 is coupled to the counterbore 210 of the turret housing 200 by the pair of mounting brackets 293. The drive gear 284 is positioned within the chamber 254, and the motor 280 is coupled to the second body surface 250 such that the output shaft 288 of the motor 280 passes through the bore 256 and is received within the bore 292 of the drive gear 284. The sensor 282 is coupled to the motor 280. The second ends 272 of the one or more isolation members 228 are coupled to the first plate surface 260 of the second mounting plate 222, and the first ends 270 are coupled to the first mounting plate 220. The third slip ring 224 is coupled to the plate projection 255, and the third bearings 226 are positioned within the one or more raceways 252. The turret housing 200 is coupled to the third slip ring 224 so as to be rotatable about the third slip ring 224, and such that the drive gear 284 meshingly engages with the driven ring gear 286 and the third bearings 226 support the rotation of the turret housing 200 relative to the first mounting plate 220.

The sensing devices 40a, 40b, 40c are coupled to the housing 108 of the gimbal 102. The second slip ring 140 is coupled to the base 126 of the support 110. The one or more second bearings 142 are positioned within the raceways, and the mounting flange 144 is coupled to the base 126. The mounting flange 144 is coupled to the base 126 such that the gimbal 102 is movable relative to the turret 104 about the second slip ring 140. The collar 234 is coupled to the mounting flange 144 and to the third slip ring 224, thereby coupling the turret 104 to the support 110 of the gimbal 102. The first slip ring 118 and the bearing 120 are coupled to the recess 128 of the first arm 122, and the bearing 120 is coupled to the second arm 124. The housing 108 is coupled to the first arm 122 and the second arm 124, thereby assembling the gimbal 102 to the turret 104.

With the gimbal 102 coupled to the turret 104, the second mounting plate 222 is coupled to the roof 14a of the autonomous vehicle 10 to couple the sensor mounting system 100 to the autonomous vehicle 10. With the sensor mounting system 100 coupled to the autonomous vehicle 10, the sensing devices 40a-40e, the motor 280 and the sensor 282 are placed in wireless or wired communication with the controller 34. As the autonomous vehicle 10 moves through an environment, the sensing devices 40a-40e coupled to the sensor mounting system 100 observe conditions in the environment and generate sensor signals based on the observation, which are communicated to the controller 34. The controller 34 also sends one or more control signals to the motor 280, which in turn cause the rotation of the output shaft 288 to drive the drive gear 284, and thus, the driven ring gear 286 to move the turret housing 200 relative to the autonomous vehicle 10 and the gimbal 102.

As the gimbal 102 includes one or more long-range sensing devices 40a-40c, and the turret 104 includes one or more short-range sensing devices 40d-40e, an object tracked by the gimbal 102 may be tracked by the turret 104 when the object enters the field of view of the turret 104. The gimbal 102 may then move to enable further long-range object detection and tracking, while one or more of the short-range sensing devices 40d-40e on the turret 104 track the identified object. By handling off the tracking from the long-range sensing devices 40a-40c of the gimbal 102 to the short-range sensing devices 40d-40e of the turret 104, the long-range sensing devices 40a-40c are available to detect and track other objects while the tracking of the identified object is maintained.

In addition, an object tracked by the turret 104 may be tracked by the gimbal 102 when the object enters the field of view of the gimbal 102. The turret 104 may then move to enable other short-range object detection and tracking, while one or more of the long-range sensing devices 40a-40c on the gimbal 102 track the identified object. By handling off the tracking from the short-range sensing devices 40d-40e of the turret 104 to the long-range sensing devices 40a-40c of the gimbal 102, the short-range sensing devices 40d-40e are available to detect and track other objects while the tracking of the identified object is maintained.

Thus, the sensor mounting system 100 of the present disclosure provides a system for mounting both the long-range and short-range sensing devices 40a, 40b . . . 40n to the autonomous vehicle 10. By mounting both long-range sensing devices 40a-40c and short-range sensing devices 40d-40e to the autonomous vehicle 10 with the sensor mounting system 100, an object detected and tracked by one of the long-range sensing devices 40a-40c may be tracked by one of the short-range sensing devices 40d, 40e upon entry of a field of view 41d, 41e (FIG. 4) of the short-range sensing devices 40d, 40e. In this regard, the sensor mounting system 100 enables the long-range sensing devices 40a-40c of the gimbal 102 to move relative to the turret 104, and vice versa, until the field of view 41a, 41b, 41c of the respective long-range sensing devices 40a-40c overlap the field of view 41d, 41e of the short-range sensing devices 40d, 40e.

In addition, the spring plate 232 defined by the first mounting plate 220, the second mounting plate 222 and the one or more isolation members 228 enables the sensor mounting system 100 to be isolated from vibrations and/or forces encountered as the autonomous vehicle 10 moves through the environment. By isolating the sensor mounting system 100 from vibrations and/or forces encountered during the movement of the autonomous vehicle 10, the sensing devices 40a, 40b . . . 40n may remain stationary while the autonomous vehicle 10 may be experiencing undesired movements, which improves the accuracy of the signals produced by the sensing devices 40a, 40b . . . 40n.

Figure 7:
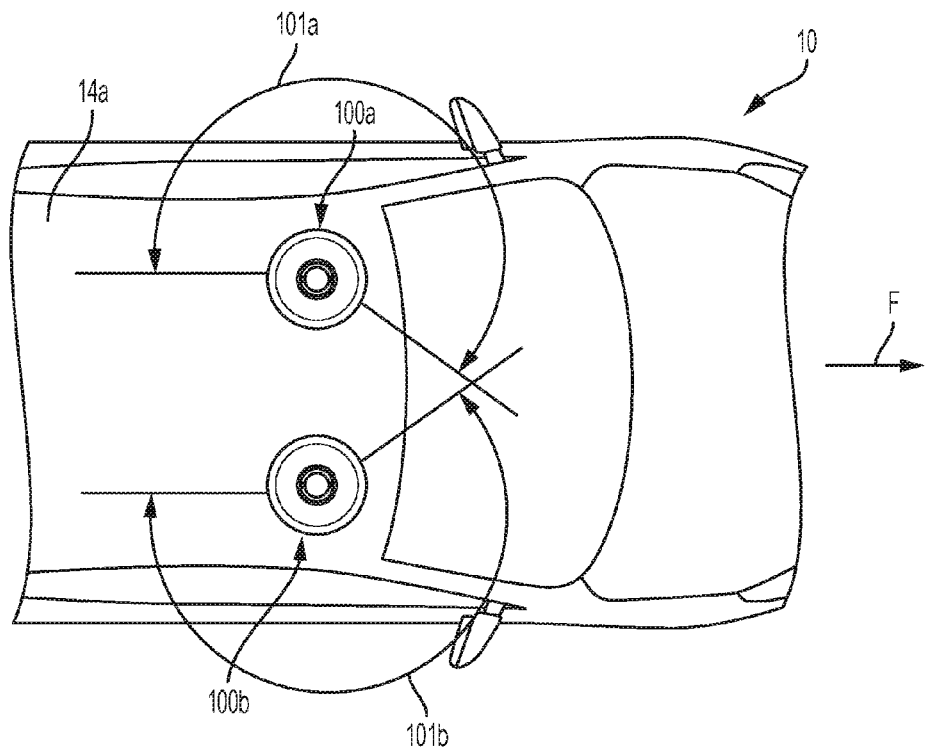
FIG. 7 is a top view of a plurality of the sensor mounting systems coupled to the roof of the autonomous vehicle of FIG. 1, in accordance with various embodiments.

It should be noted that the configuration of the sensor mounting system 100 on the autonomous vehicle 10 as described herein is not limited to the configuration shown in FIGS. 3-6. In this regard, with reference to FIG. 7, the autonomous vehicle 10 is shown with two of the sensor mounting systems 100, labeled 100a and 100b, respectively.

In this example, the sensor mounting systems 100a, 100b are positioned so as to be spaced apart from each other on the roof 14a of the autonomous vehicle 10. This enables a field of view 101a of the sensor mounting system 100a to at least partially overlap a field of view 101b of the sensor mounting system 100b, which may enable an object tracked by the sensor mounting system 100a to be tracked by the sensor mounting system 100b if the object is moving substantially parallel to the forward direction F of the autonomous vehicle 10.

Figure 8:
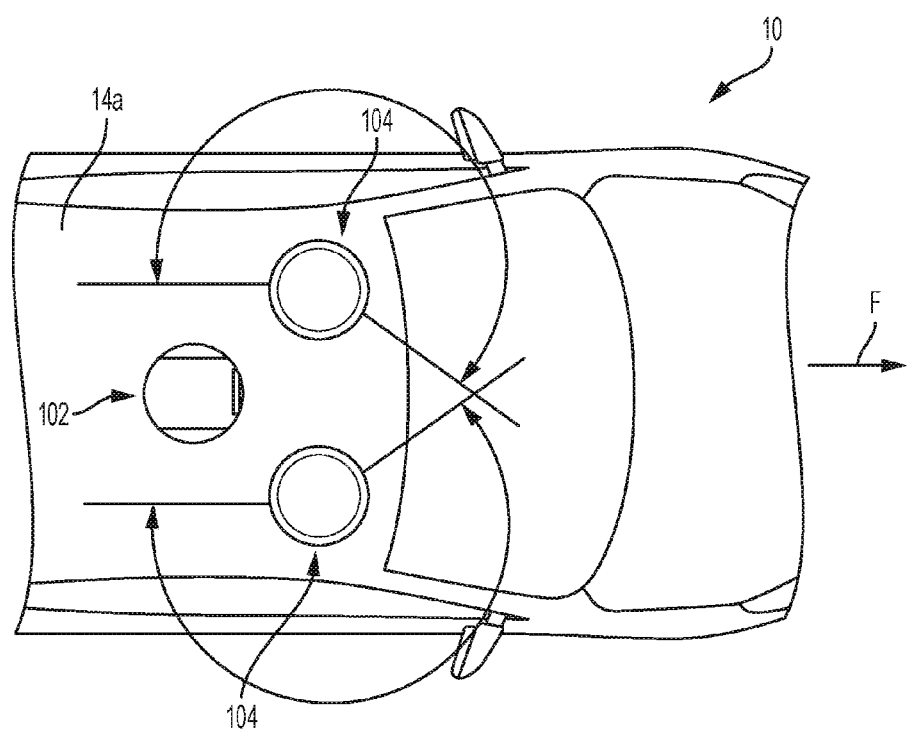
FIG. 8 is a top view of a gimbal and a plurality of turrets associated with the sensor mounting system of the autonomous vehicle of FIG. 1 coupled to the roof of the autonomous vehicle of FIG. 1, in accordance with various embodiments.

Further, with reference to FIG. 8, in another embodiment, the autonomous vehicle 10 is shown with a pair of the turrets 104 and a gimbal 102, which is spaced apart from the pair of turrets 104. In this example, the turrets 104 are coupled to the roof 14a of the autonomous vehicle 10 via the respective second mounting plate 222 such that the turrets 104 are each individually movable relative to the autonomous vehicle 10 in one degree of freedom. The gimbal 102 is coupled to the roof 14a of the autonomous vehicle 10 via the mounting flange 144, such that the gimbal 102 is movable relative to the autonomous vehicle 10 in two degrees of freedom.

Figure 9:
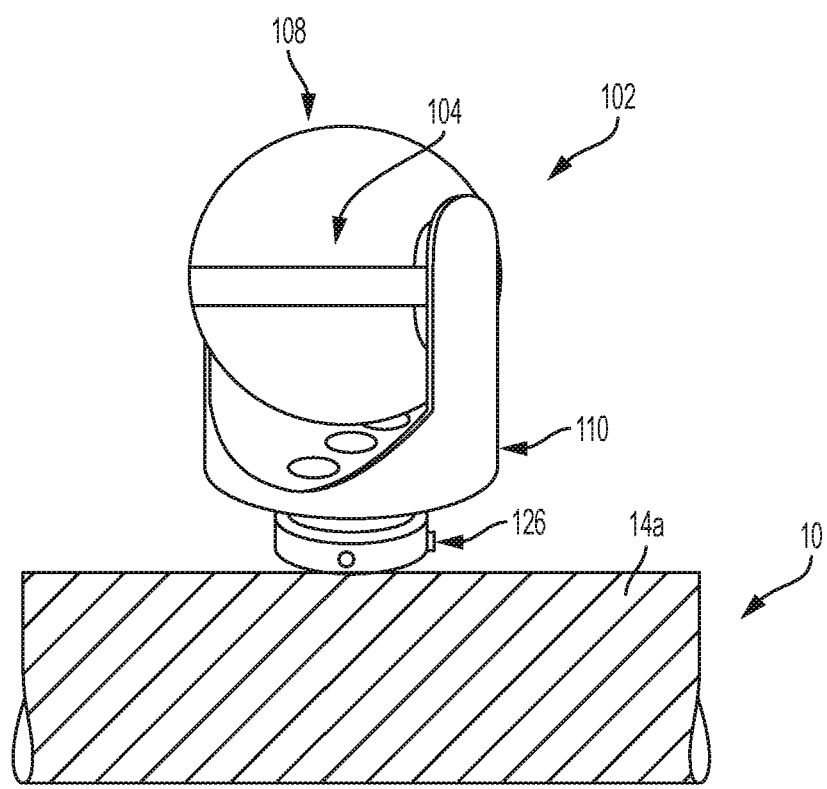
FIG. 9 is a perspective view of a gimbal associated with the sensor mounting system of the autonomous vehicle of FIG. 1, which includes a turret coupled within a housing of the gimbal, the gimbal coupled to the roof of the autonomous vehicle of FIG. 1, in accordance with various embodiments.

As a further example, with reference to FIG. 9, in one embodiment, the turret 104 is mounted within the housing 108 of the gimbal 102. In this example, the turret 104 is movable about a single degree of freedom within the housing 108, and the gimbal 102 is movable about two degrees of freedom relative to the autonomous vehicle 10. The gimbal 102 may be coupled to the roof 14a of the autonomous vehicle 10 via the mounting flange 144.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A sensor mounting system for a vehicle, comprising:
    a mounting assembly coupled to a body of the vehicle, the mounting assembly having a first mounting plate spaced apart from a second mounting plate by at least one isolation member, the second mounting plate coupled to the body of the vehicle; and
    a turret housing coupled to the first mounting plate so as to be movable relative to the first mounting plate, the turret housing defining at least one receptacle for a first sensing device,
    wherein the turret housing includes a counterbore, and the mounting assembly is received within the counterbore such that the turret housing substantially surrounds the mounting assembly.

2. The sensor mounting system of claim 1, wherein the turret housing is movable relative to the vehicle in one degree of freedom.

3. The sensor mounting system of claim 1, further comprising a first slip ring that couples the turret housing to the first mounting plate.

4. The sensor mounting system of claim 1, further comprising a drive system that moves the turret housing relative to the first mounting plate, with a portion of the drive system coupled to the first mounting plate.

5. The sensor mounting system of claim 4, wherein the drive system further comprises a motor, a drive gear and a driven ring gear, the motor having an output shaft coupled to the drive gear, and the drive gear is coupled to the driven ring gear such that an activation of the motor drives the drive gear, which drives the driven ring gear.

6. The sensor mounting system of claim 5, wherein the first mounting plate defines a chamber, and the drive gear of the drive system is received within the chamber.

7. The sensor mounting system of claim 5, wherein the driven ring gear is coupled to the turret housing.

8. The sensor mounting system of claim 1, further comprising a gimbal that includes a second sensing device and the gimbal is coupled to the first mounting plate.

9. The sensor mounting system of claim 1, wherein the at least one isolation member is at least one spring.

10. A sensor mounting system for a vehicle, comprising:
a mounting assembly coupled to a body of the vehicle, the mounting assembly having a first mounting plate spaced apart from a second mounting plate by at least one isolation member, the second mounting plate coupled to the body of the vehicle;
a turret housing coupled to the first mounting plate so as to be movable relative to the first mounting plate, the turret housing defining at least one receptacle for a first sensing device and the turret housing substantially surrounds the mounting assembly; and
a gimbal including a second sensing device coupled to the first mounting plate.

11. The sensor mounting system of claim 10, wherein the turret housing is movable relative to the vehicle in one degree of freedom.

12. The sensor mounting system of claim 10, further comprising a drive system that moves the turret housing relative to the first mounting plate, with a portion of the drive system coupled to the first mounting plate.

13. The sensor mounting system of claim 12, wherein the drive system further comprises a motor, a drive gear and a driven ring gear, the motor having an output shaft coupled to the drive gear, and the drive gear is coupled to the driven ring gear such that an activation of the motor drives the drive gear, which drives the driven ring gear.

14. The sensor mounting system of claim 13, wherein the first mounting plate defines a chamber, and the drive gear of the drive system is received within the chamber.

15. The sensor mounting system of claim 13, wherein the driven ring gear is coupled to the turret housing.

16. The sensor mounting system of claim 10, wherein the turret housing includes a counterbore, and the mounting assembly is received within the counterbore.

17. An autonomous vehicle, comprising:
a spring plate coupled to a body of the autonomous vehicle, the spring plate having a first mounting plate spaced apart from a second mounting plate by at least one spring, the second mounting plate coupled to the body of the autonomous vehicle;
a turret housing coupled to the first mounting plate so as to be movable relative to the first mounting plate, the turret housing defining at least one receptacle for a first sensing device and a counterbore, with the spring plate at least partially received within the counterbore such that the turret housing substantially surrounds the spring plate; and
a gimbal including a second sensing device coupled to the first mounting plate.

18. The autonomous vehicle of claim 17, further comprising a drive system that moves the turret housing relative to the first mounting plate, with a portion of the drive system coupled to the first mounting plate.

19. The autonomous vehicle of claim 18, wherein the drive system further comprises a motor, a drive gear and a driven ring gear, the motor having an output shaft coupled to the drive gear, and the drive gear is coupled to the driven ring gear such that an activation of the motor drives the drive gear, which drives the driven ring gear; and
wherein the first mounting plate defines a chamber, and the drive gear of the drive system is received within the chamber.

* * * * *